United States Patent [19]
Rosen

[11] Patent Number: 5,941,488
[45] Date of Patent: Aug. 24, 1999

[54] MONITOR SUPPORT WITH SELF-POSITIONING GUIDE TRACK

[75] Inventor: John B. Rosen, Eugene, Oreg.

[73] Assignee: Rosen Product Development, Inc., Eugene, Oreg.

[21] Appl. No.: 09/021,971

[22] Filed: Feb. 11, 1998

Related U.S. Application Data

[63] Continuation-in-part of application No. 29/072,624, Jun. 20, 1997, abandoned.

[51] Int. Cl.[6] .................................................... F16M 11/00
[52] U.S. Cl. ..................... 248/278.1; 224/551; 224/553; 224/929; 248/921
[58] Field of Search ................................ 248/278.1, 917, 248/919, 920, 921, 922, 923, 918, 676, 125.9, 121, 161, 157, 291.1, 284.1; 224/929, 551, 553

[56] References Cited

U.S. PATENT DOCUMENTS

| | | |
|---|---|---|
| D. 340,235 | 10/1993 | Robak et al. . |
| D. 360,126 | 7/1995 | Rosen . |
| D. 367,477 | 2/1996 | Rosen . |
| 5,076,524 | 12/1991 | Reh et al. . |
| 5,177,616 | 1/1993 | Riday . |
| 5,179,447 | 1/1993 | Lain . |
| 5,195,709 | 3/1993 | Yasushi . |
| 5,222,780 | 6/1993 | Reh et al. . |
| 5,271,590 | 12/1993 | Rosen . |
| 5,311,302 | 5/1994 | Berry et al. . |
| 5,547,248 | 8/1996 | Marechal ............................ 297/188.17 |

*Primary Examiner*—Ramon O. Ramirez
*Attorney, Agent, or Firm*—Kolisch, Hartwell, Dickinson, McCormack & Heuser

[57] ABSTRACT

A monitor support system with self-positioning guide track that includes a base configured for mounting in the interior of a land vehicle, and a monitor support member positioned for sliding motion through a bore in the base. The monitor support member supports a monitor, and may be moved between a stowed position wherein a supported monitor is positioned adjacent the base for storage and a deployed position wherein a supported monitor is positioned away from the base for use by a vehicle occupant. The monitor support member may include a longitudinal guideway and the base may include a guideway positioning element that engages the guideway to guide sliding longitudinal movement of the monitor support member along a desired trajectory between the stowed and deployed positions. The monitor support member further may include at least one transverse guideway that engages the guideway positioning element to permit transverse sliding movement of the monitor support member following deployment along the longitudinal axis.

22 Claims, 3 Drawing Sheets

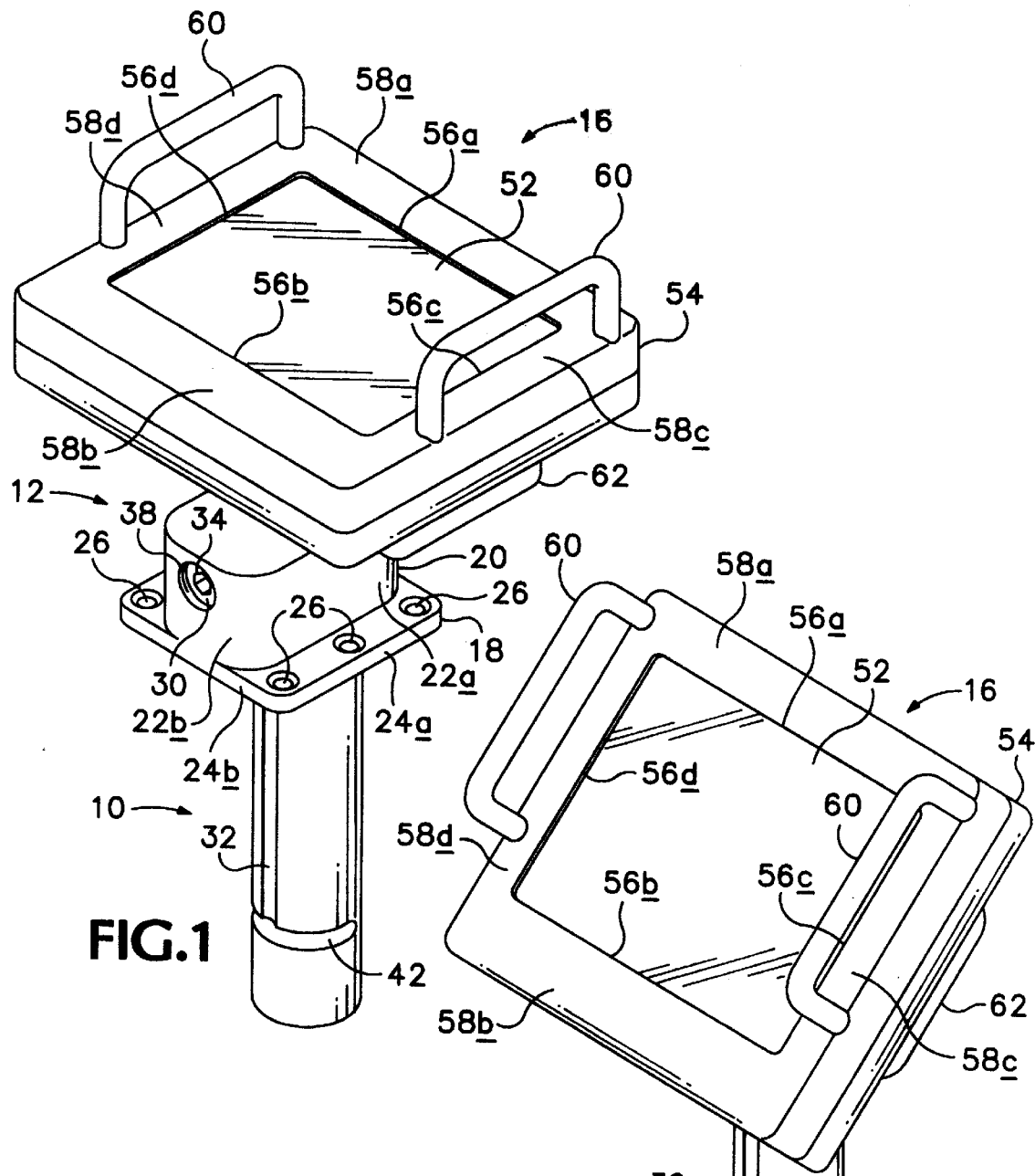
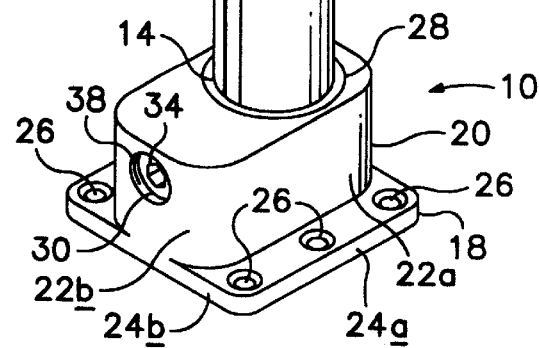

MONITOR SUPPORT WITH SELF-POSITIONING GUIDE TRACK

This is a continuation-in-part of application Ser. No. 29/072,624, filed Jun. 20, 1997, entitled PEDESTAL MONITOR, now abandoned.

TECHNICAL FIELD

The present invention relates generally to monitor supports, and more particularly, to a monitor support with a self-positioning guide track for use in a vehicle to conveniently and reproducibly guide movement of a monitor between a stowed position for storage and a deployed position for viewing by a vehicle occupant.

BACKGROUND OF THE INVENTION

In recent years, there has been an effort to bring video technology into vehicles, either in the form of a television, a computer, or a video game display. The goal has been to provide vehicle occupants with information and/or entertainment beyond that offered by simple dashboard gauges and conventional vehicle audio systems.

Despite these efforts, video monitors, until now, have been impractical as vehicle accessories. This impracticability has resulted from the relatively bulky size and inferior picture quality of most portable monitors, and from difficulties inherent in establishing and maintaining the monitor's position and orientation.

Recent advances in flat-panel technology have addressed problems previously associated with monitor size and picture quality, providing dramatically improved picture quality in smaller monitors. However, problems associated with monitor position and orientation have persisted. In particular, when in use, monitors typically should be deployed where they may be viewed by one or more vehicle occupants from their established seats without obstructing the mobility or view of other occupants. In addition, when not in use, monitors should be stowed where they maximize occupant space and facilitate occupant ingress and egress. Finally, monitor movement between stowed and deployed configurations should be simple, convenient, and reproducible, so that movement may be accomplished within a cramped, moving vehicle.

SUMMARY OF THE INVENTION

The present invention addresses these and other needs by providing a monitor support system that includes a base configured for mounting in an interior region of a vehicle, and a monitor support member positioned for sliding motion through a bore in the base. The monitor support member supports a monitor, and may be moved between a stowed position wherein the supported monitor is positioned adjacent the base for storage and a deployed position wherein the monitor is positioned away from the base for use by a vehicle occupant.

In one embodiment of the invention, the monitor support member includes a longitudinal guideway and the base includes a guideway positioning element that engages the guideway to guide sliding longitudinal movement of the monitor support member between the stowed and deployed positions. The longitudinal guideway may extend substantially parallel to a long axis of the monitor support member to guide simple translational motion of the monitor support member. Alternatively, the longitudinal guideway may extend helically about the monitor support member to guide spiral motion of the monitor support member. Typically, trajectory and final position of the monitor support member are preselected to accommodate reproducible positioning of a monitor for viewing.

The invention further may include at least one transverse guideway that engages the guideway positioning element to permit rotation of the monitor support member following deployment along the longitudinal axis. The transverse guideway allows fine control over monitor orientation about a first orientation axis substantially parallel to the long axis of the monitor support member. The transverse guideway also may be used to lock the monitor into the deployed position.

In one embodiment of the present invention, the monitor support member is substantially cylindrical and extends completely through the base. In addition, the longitudinal and transverse guideways form a continuous channel recessed into the cylindrical monitor support member, and the guideway positioning element forms a pin that protrudes into the guideway channel.

In alternative embodiments, the monitor support member may extend only partially through the base, or the member may have plural sections that telescope into one another and into the base.

The invention further may include a monitor that is pivotal about an axis generally perpendicular to a long axis of the monitor support member. This pivot feature allows fine control over the orientation of the monitor about a second orientation axis generally perpendicular to the first orientation axis provided by the transverse guideway. The monitor typically is pivotal such that its viewing surface is generally perpendicular to a long axis of the monitor support member when the monitor is in the stowed position, and is at an angle of between approximately 15-degrees and 90-degrees from the stowed position when the monitor is in the deployed position. A combination of monitor pivoting and movement along appropriate guideways permits the monitor to be deployed conveniently and reproducibly for viewing from any preselected position within the vehicle.

The nature of the present invention will be understood more readily after consideration of the drawings and the detailed description of preferred embodiments that follow.

BRIEF DESCRIPTION OF THE DRAWINGS

FIG. 1 is an isometric view of a pedestal monitor constructed in accordance with the present invention, the monitor and monitor support member being shown in their stowed orientation and position, respectively.

FIG. 2 is an isometric view of the pedestal monitor shown in FIG. 1, the monitor and monitor support member being shown in their deployed orientation and position, respectively.

1, in which there are two transverse guideways for deployment at two predetermined positions.

Figure 7:
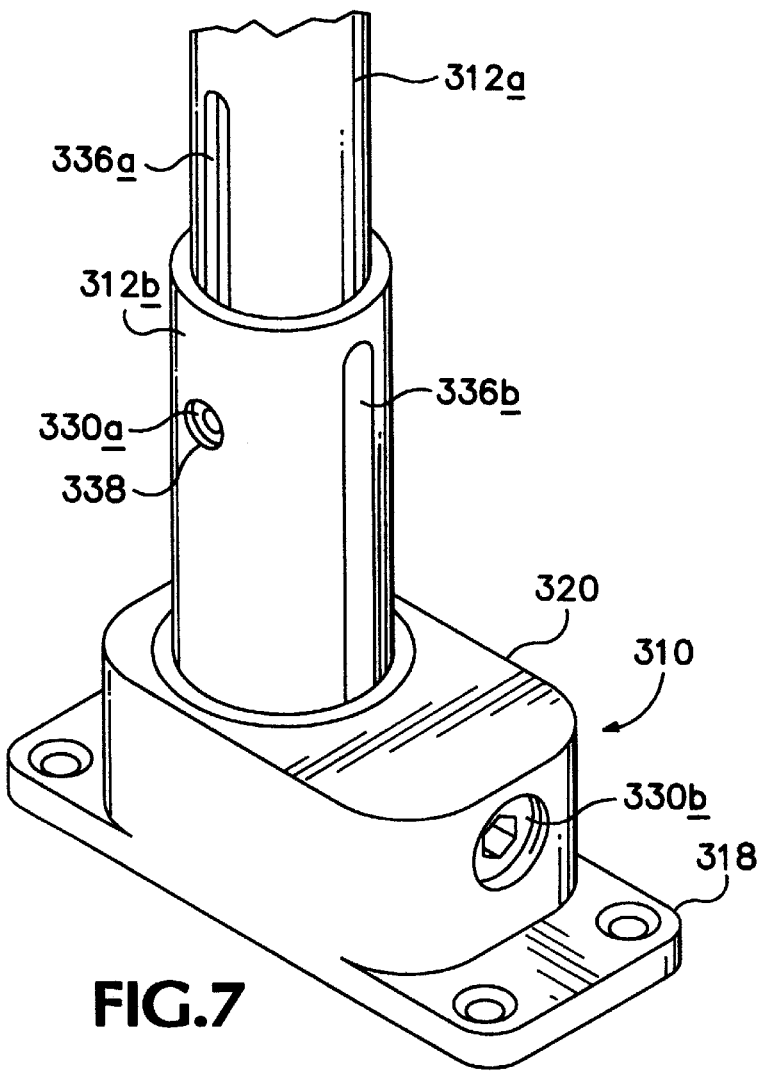

FIG. 7 is a fragmentary isometric view of yet another alternative embodiment of the monitor support member, in which the monitor support member includes telescoping sections.

DETAILED DESCRIPTION EMBODIMENT AND BEST MODE OF CARRYING OUT THE INVENTION

Figure 3:
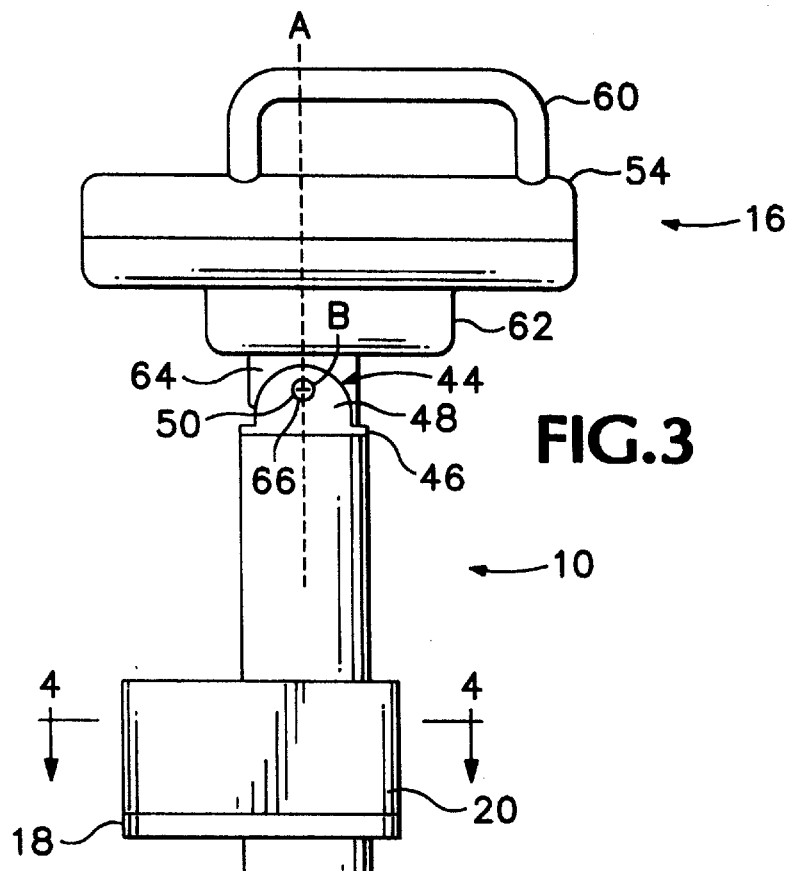
FIG. 3 is a right-side view of the pedestal monitor shown in FIG. 1, the monitor being shown in its stowed orientation and the monitor support member being shown in an intermediate position part-way between its stowed and deployed positions.

FIGS. 1–4 show a preferred embodiment of the present invention, which generally includes a base 10 configured for mounting in an interior region of a vehicle, a monitor support member 12 positioned for sliding and turning motion through a bore 14 in the base, and a monitor 16 supported by the monitor support member. The monitor support member may be moved between a stowed position wherein the monitor is positioned adjacent the base for storage (FIG. 1) and a deployed position wherein the monitor is positioned away from the base for use by a vehicle occupant (FIG. 2). A representative intermediate position also is shown in FIG. 3.

Base 10 is configured for mounting in the interior of a vehicle and serves to engage and guide movement of monitor support member 12. The preferred base material is a lightweight metal. Generally, the base should contain one surface suitable for attachment to a complementary surface of the vehicle. In addition, the base should be robust enough stably to support the monitor support member and monitor.

Base 10 includes a lower section 18 and an upper section 20, which may be formed as a single piece. Lower section 18 is planar and has a uniform thickness and a largely square perimeter. Upper section 20 also is planar but possesses a greater thickness than the lower section and a largely rectangular perimeter. Sides 22a of the upper section are equal in length to the sides 24a, 24b of the lower section, and sides 22b of the upper section are shorter in length than the sides 24a, 24b of the lower section. The upper section is centered atop the lower section to form the body of the base. All vertical edges typically are rounded to eliminate sharp corners that could present an impact hazard to a vehicle occupant. The lower section presents a comparatively large and stable area for anchoring the base to a vehicle, and may be affixed thereto by fasteners such as bolts through holes 26 positioned along the lower section of the base.

The base includes a bore 14 configured to slidingly and rotatably receive monitor support member 12. The bore may extend completely through the base, as disclosed in FIGS. 1–4, or only partially through the base. In the depicted embodiment an annular insert 28 composed of a material, such as a slick plastic, lines the bore to facilitate movement of the monitor support member through the bore. Bore 14 has a uniform circular cross-section and is oriented substantially perpendicular to the mounting surface. In addition, the bore is set off from the center of the base such that the base possesses bilateral but not radial symmetry.

Figure 4:
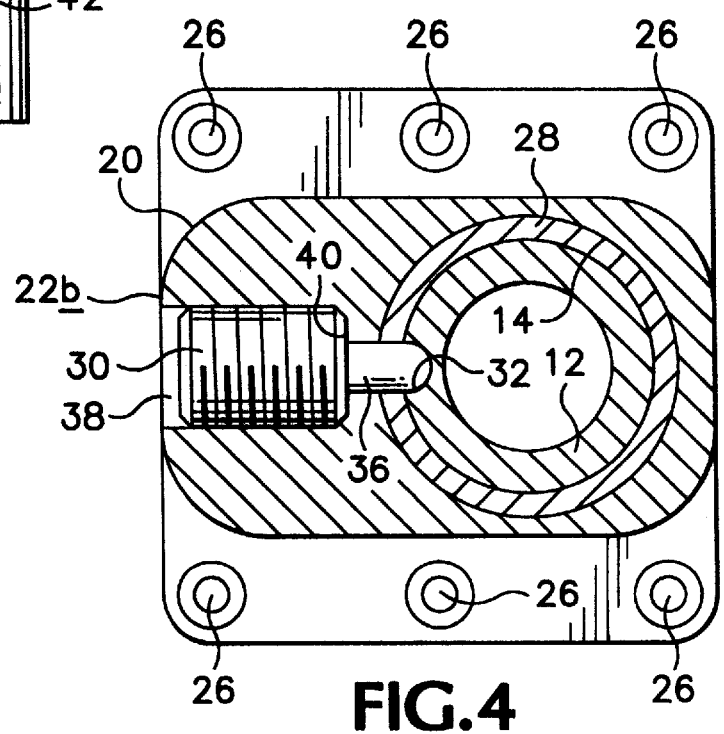
FIG. 4 is a cross-sectional view, taken generally along the lines 4—4 in FIG. 3.

FIG. 4 shows a cross-section of the preferred base, taken along the line 4—4 in FIG. 3. This view reveals a guideway positioning element 30 that engages a corresponding guideway 32 in the monitor support member. In the depicted embodiment, the guideway positioning element takes the form of a screw having inner and outer ends. The outer end has a slot 34 (FIG. 1) to receive a standard screwdriver; the inner end narrows to form a tip 36 that engages guideway 32. The guideway positioning element is threaded into a guideway positioning element hole 38 formed in side 22b of the upper section 20 of the base. This hole is oriented substantially perpendicular to the monitor support member and is substantially bisected by a plane of bilateral symmetry running through the base. The hole narrows at its inner end to form a partial wall 40 that limits motion of guideway positioning element 30. Although in this embodiment the guideway positioning element is held in place by threads, other mechanisms also could be employed.

Monitor support member 12 serves both to support and guide movement of monitor 16 and to engage base 10. The monitor support member preferably is made from a lightweight metal. As indicated, the monitor support member is generally elongate, with the preferred shape being a cylinder having a long axis A, and bottom and top ends. The bottom end is slidingly and rotatably received by the base through bore 14. The top end supports monitor 16.

The monitor support member includes a longitudinal guideway 32 that is engaged by guideway positioning element 30 in base 10 to guide longitudinal sliding motion of the monitor support member as described above. Generally, the longitudinal guideway is used to establish the vertical position of the supported monitor relative to the base and user. In the embodiment shown in FIGS. 1–4, the longitudinal guideway extends substantially parallel to long axis A to guide simple translational motion of the monitor support member between the stowed position (FIG. 1) and deployed position (FIG. 2).

The monitor support member also may include a transverse guideway 42 that is engaged by guideway positioning element 30 to guide transverse turning motion of the monitor support member. Generally, the transverse guideway is used to establish the orientation of the supported monitor relative to base and user. In the embodiment shown in FIGS. 1–4, the transverse guideway extends approximately 180-degrees around the monitor support member in a plane perpendicular to long axis A, defining a plane which is orientated substantially perpendicular to the longitudinal guideway. The transverse guideway is positioned symmetrically relative to the longitudinal guideway, permitting the monitor support member and the supported monitor to be rotated approximately 90-degrees in either direction after deployment along longitudinal guideway 32.

The trajectory followed by the monitor support member during movement between the stowed and deployed positions thus is determined by the longitudinal and transverse guideways. The configuration of these guideways is preselected to accommodate convenient and reproducible positioning of the monitor for viewing from established positions within a vehicle.

The guideways may take a number of forms, and may be raised or recessed relative to the surface of the monitor support member. In the embodiment shown in FIGS. 1–4, the longitudinal and transverse guideways both take the form of channels recessed into the monitor support member. These channels have a substantially semi-circular cross-section. In addition, the channels may define gently rounded depressions (not shown) corresponding to preferred locking positions and orientations of the monitor support member and the supported monitor, as discussed below.

The guideway positioning element also may take various forms, but typically is a protuberance chosen to complement the form of the corresponding guideway. In the depicted embodiment, guideway 32 takes the form of a channel and guideway positioning element 30 takes the form of a pin threaded into guideway positioning element hole 38 in base 10 such that the pin engages the guideway. Alternatively, a spring-loaded pin that would extend to meet additional depressions in the channel could be used, locking the monitor support member and supported monitor into preselected positions. Such a locking mechanism would be overcome through application of sufficient sliding or turning force to recompress the spring as the pin rides up the sides of the gently rounded depressions.

FIG. 3 shows the top end of monitor support member 12. The top end includes an assembly 44 for receiving monitor 16. The assembly includes a sleeve 46 that fits over the top end of monitor support member 12. This sleeve typically is substantially cylindrical. The sleeve in turn supports two opposed substantially semicircular flanges 48 that extend away from the monitor support member, and parallel to long axis A. The flange diameter typically is smaller than the diameter of the monitor support member. Opposed holes 50 in the flanges are employed in mounting monitor 16, as described below.

Monitor 16 is supported by monitor support member 12. Specifically, the monitor attaches to the top end of the monitor support member. Any suitably sized monitor may be employed with the invention, including but not limited to those associated with a television, a computer, or a video game display. In the depicted embodiment, a flat-panel monitor is employed. The monitor includes a screen 52 and a housing 54 for holding and presenting the screen. The screen is planar with a generally rectangular perimeter having opposed top and bottom edges (56a, 56b) and opposed side edges (56c, 56d). The housing frames the screen and provides the screen with support and protection. Like the screen, the upper surface of the housing is planar with a largely rectangular perimeter having opposed top and bottom margins (58a, 58b) and opposed side margins (58c, 58d). The margins correspond to the portion of the housing between the edges of the screen and the edges of the housing. The top margin is smaller than the bottom margin, whereas the two side margins are equal in extent. The monitor thus possesses bilateral but not radial symmetry. The screen is slightly recessed into the housing along its four edges.

The monitor also includes a pair of "U"-shaped handles 60 to facilitate reorientation of the monitor about a pivot axis B, as well as sliding and turning movement of the monitor and monitor support member between the stowed and deployed positions along axis A. The handles are mounted adjacent the screen in side margins (58c, 58d) of the housing. More specifically, the handles are located near the outer edges of the side margins to minimize visual obstruction of the screen. Moreover, the handles are located near the top margin 58a of the housing to maximize the torque available to pivot the screen, the torque being a function of the lever arm as measured from the pivot axis. The handles and all edges on the monitor typically are rounded to eliminate sharp corners that could present an impact hazard to a vehicle occupant.

The housing also includes a compartment 62 shaped as a right parallelepiped for housing components of the monitor electronics. This compartment is centered relative to the screen surface of the monitor.

The underside of the monitor also includes a single rib 64 that extends downward perpendicular to the plane of the screen 52. The rib is centered relative to the side margins of the monitor, but is offset toward the bottom margin 58b. The rib includes a hole that may be aligned with holes in the upwardly extending flanges 48 on the member support element. A pivot pin 66 is inserted through the aligned holes when the monitor is mounted, defining a pivot axis B for the monitor.

When thus mounted, the monitor 16 pivots between a first (stowed) orientation in which the screen is generally horizontal (FIG. 1) and a second (deployed) orientation in which the screen is angled relative to the horizontal (FIG. 2) for viewing by one or more vehicle occupants. Pivot axis B is substantially perpendicular to the long axis of the member, and substantially parallel to the top and bottom edges of the screen. The preferred orientation of the monitor when deployed will vary with use and user but will typically lie in the range of 15 degrees to 90 degrees. Larger angles will generally be appropriate for shorter viewers, such as children.

Figure 5:
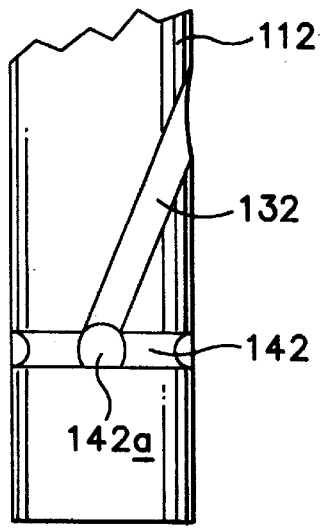
FIG. 5 is a fragmentary front view of an alternative embodiment of the monitor support member shown in FIG. 1, in which the linear longitudinal guideway has been replaced by a helical guideway.
Figure 6:
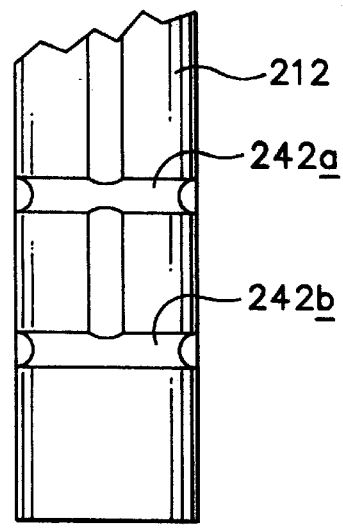
FIG. 6 is a fragmentary front view of another alternative embodiment of the monitor support member shown in FIG.

FIGS. 5 and 6 show alternative embodiments of the guideway. FIG. 5 shows a monitor support member 112 with a helical guideway 132, which combines aspects of both the longitudinal and transverse guideways. This guideway turns the monitor about the long axis of the monitor support member as the monitor is stowed or deployed, permitting the monitor to be stowed and deployed in different orientations, or deployed at different orientations. The helical guideway may meet a transverse guideway 142. As indicated, transverse guideway 142 may define a detent 142a for limiting transverse rotation of the monitor support member relative to transverse guideway 142.

FIG. 6 shows a monitor support member 212 with a plurality of transverse guideways 242a and 242b. Plural transverse guideways permit the monitor to be deployed at different heights to suit different uses and users.

FIG. 7 shows another alternative embodiment of the monitor support member. As indicated, the single-piece member shown in FIGS. 1–4 has been replaced by a telescoping member. A telescoping member reduces the size of the system when in the stowed position. Generally, increasing the number of segments will decrease the stowed size, but will increase overall complexity. The disclosed embodiment includes two segments. An inner cylindrical first segment 312a supports the monitor, essentially as described above for the single-piece member. An outer annular second segment 312b engages base 310 and guideway positioning element 330b located therein, again essentially as described above for the single-piece member. A guideway 336b in outer member 312b is analogous to guideway 36 in single-piece member 12. An additional guideway 336a in inner member 312a engages an additional guideway positioning element 330a located in a guideway positioning element hole 338 in outer member 312b. Transverse guideways (not visible in this view) in either or both the inner and outer members permit the monitor to be turned about a common long axis of the members when deployed.

Base 310 in FIG. 7 is configured much as base 10 in the embodiment shown in FIGS. 1–4, except that the lower section 318 of the base now extends to the front and back of upper section 320, rather than to the sides.

Accordingly, while the present invention has been shown and described with reference to the foregoing preferred devices and methods for its use, it will be apparent to those skilled in the art that other changes in form and detail may be made therein without departing from the spirit and scope of the invention as defined in the appended claims.

I claim:

1. A monitor support system for use in mounting a monitor in an interior region of a vehicle, the monitor support system comprising:

a base configured for mounting in the interior region of the vehicle, the base defining a bore of predetermined size and shape;

an elongate monitor support member for mounting a monitor, the monitor support member having a long axis and a plurality of telescoping segments, including a first segment for engaging the base and a second segment for mounting a monitor, each segment having predetermined size and shape that allows the monitor support member to be positioned at least partially within the bore for telescoping sliding longitudinal movement within the bore between a stowed position wherein the monitor is positioned a first predetermined distance from the base, and a deployed position wherein the monitor is positioned a second predetermined distance from the base for use by a vehicle occupant; and wherein the monitor support member includes a longitudinal guideway and the base includes a guideway positioning element, the longitudinal guideway operatively being engaged by the guideway positioning element to guide sliding longitudinal movement of the monitor support member within the bore between the stowed position and the deployed position.

2. A monitor support system for use in mounting a monitor in an interior region of a vehicle, the monitor support system comprising:

a base configured for mounting in the interior region of the vehicle, the base defining a bore of predetermined size and shape; and an elongate monitor support member for mounting a monitor, the monitor support member being of predetermined size and shape to allow the monitor support member to be positioned at least partially within the bore for sliding longitudinal movement within the bore between a stowed position wherein the monitor is positioned a first predetermined distance away from the base, and a deployed position wherein the monitor is positioned a second predetermined distance away from the base for use by a vehicle occupant, wherein the monitor support member includes a longitudinal guideway and the base includes a guideway positioning element, the longitudinal guideway operatively being engaged by the guideway positioning element to guide sliding longitudinal movement of the monitor support member within the bore between the stowed position and the deployed position.

3. The monitor support system of claim 2, wherein the longitudinal guideway extends substantially parallel to a long axis of the monitor support member.

4. The monitor support system of claim 2, wherein the longitudinal guideway extends helically about the monitor support member.

5. The monitor support system of claim 2, wherein the monitor support member includes a transverse guideway which meets the longitudinal guideway, the transverse guideway being operatively engaged by the guideway positioning element to permit rotation of the monitor support member about a long axis of the member.

6. The monitor support system of claim 5, wherein the monitor support member includes a plurality of transverse guideways at predetermined longitudinal positions along the monitor support member.

7. The monitor support system of claim 5, wherein the longitudinal and transverse guideways form a continuous channel recessed into the member, and the guideway positioning element forms a protuberance that protrudes into the channel.

8. The monitor support system of claim 7, wherein the monitor support member is substantially cylindrical with a long axis, and the longitudinal guideway is oriented substantially parallel to the long axis.

9. The monitor support system of claim 8, wherein the transverse guideway defines a plane oriented substantially perpendicular to the longitudinal guideway.

10. The monitor support system of claim 9, further comprising a monitor.

11. A monitor support system for use in mounting a monitor in an interior region of a vehicle, the monitor support system comprising:

a base configured for mounting in the interior region of the vehicle, the base defining a bore of predetermined size and shape; and an elongate monitor support member for mounting a monitor, the monitor support member having a long axis and a plurality of telescoping segments, including a first segment for engaging the base and a second segment for mounting a monitor, each segment having predetermined size and shape that allows the monitor support member to be positioned at least partially within the bore for telescoping sliding longitudinal movement between a stowed position wherein the monitor is positioned a first predetermined distance from the base, and a deployed position wherein the monitor is positioned a second predetermined distance from the base for use by a vehicle occupant, and wherein the first and second segments of the monitor support member include a longitudinal guideway, and the base and first segment of the monitor support member include a guideway positioning element, the longitudinal guideway on the first segment engaging the guideway positioning element on the base, and the longitudinal guideway on the second segment engaging the guideway positioning element on the first segment to guide telescoping sliding longitudinal movement of the monitor support member between the stowed position and the deployed position.

12. The monitor support system of claim 11, wherein each longitudinal guideway extends substantially parallel to the long axis of the monitor support member.

13. The monitor support system of claim 11, wherein at least one segment of the monitor support member includes a transverse guideway which meets the longitudinal guideway in that segment, the transverse guideway being operatively engaged by the guideway positioning element alternatively engaged by longitudinal guideway to permit rotation of the monitor support member about the long axis of the monitor support member.

14. The monitor support system of claim 13, wherein the guideways form continuous channels recessed into the segments, and the guideway positioning elements form protuberances that protrude into such channels.

15. The monitor support system of claim 14, wherein the first segment of the monitor support member is substantially cylindrical, and the second segment of the monitor support member is substantially annular, each segment having a common long axis, with the longitudinal guideways oriented substantially parallel to the long-axis.

16. The monitor support system of claim 15, wherein the transverse guideway lies generally in a plane oriented substantially perpendicular to the longitudinal guideway.

17. The monitor support system of claim 16, further comprising a monitor.

18. A pedestal monitor for use in an interior region of a vehicle, the pedestal monitor comprising:

a monitor having a viewing surface;

an elongate monitor support member for supporting the monitor, the monitor support member defining an elongate longitudinal guideway; and a base defining a bore for slidingly receiving the member, the base including a guideway positioning element that engages the guideway to guide sliding longitudinal movement of the monitor support member between a stowed position wherein the monitor is positioned at a first predetermined distance from the base, and a deployed position wherein the monitor is positioned at a second predetermined distance from the base for use by a vehicle occupant.

19. The pedestal monitor of claim 18, wherein the monitor is pivotal about a pivot axis substantially parallel to a predetermined edge of the viewing surface and generally perpendicular to a long axis of the monitor support member to effect pivotal movement of the viewing surface between a stowed orientation and a deployed orientation.

20. The pedestal monitor of claim 19, wherein the viewing surface is generally perpendicular to a long axis of the monitor support member when the monitor is in the stowed orientation.

21. The pedestal monitor of claim 19, wherein the viewing surface is at an angle of between approximately 15-degrees and 90-degrees from the stowed orientation when the monitor is in the deployed orientation.

22. The pedestal monitor of claim 19, wherein the monitor has handles to facilitate movement between the stowed and deployed orientations.

* * * * *